(12) United States Patent
Nakazawa

(10) Patent No.: US 6,676,519 B2
(45) Date of Patent: Jan. 13, 2004

(54) VIDEO GAME INCLUDING CHARACTER CAPABILITY SETTING

(75) Inventor: Takatsugu Nakazawa, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 0 days.

(21) Appl. No.: 09/964,817

(22) Filed: Sep. 28, 2001

(65) Prior Publication Data

US 2002/0198046 A1 Dec. 26, 2002

(30) Foreign Application Priority Data

Jun. 22, 2001 (JP) .................................... 2001-190363

(51) Int. Cl.$^7$ ..................... A63F 13/00; A63F 9/24; G06F 17/00; G06F 19/00
(52) U.S. Cl. ........................ 463/31; 463/32; 463/33; 463/1
(58) Field of Search ................ 463/1–9, 30–32, 463/40–43, 15, 36; 700/91; 273/236–237; 345/474; 434/99

(56) References Cited

U.S. PATENT DOCUMENTS

| | | | | |
|---|---|---|---|---|
| RE35,314 E | * | 8/1996 | Logg .......................... | 463/2 |
| 6,139,433 A | * | 10/2000 | Miyamoto et al. ............ | 463/32 |
| 6,270,402 B1 | * | 8/2001 | Fujioka et al. ................. | 463/2 |
| 6,306,036 B1 | * | 10/2001 | Burns et al. .................. | 463/31 |
| 6,428,414 B1 | * | 8/2002 | Shimomura et al. .......... | 463/31 |

OTHER PUBLICATIONS

The Legend of Zelda: Ocarina of Time Instruction Booklet [online] Dec. 31, 1999 [retrieved on Oct. 1, 2003]. Retrieved from the internet: <URL: http://www.cheatcc.com/n64/manuals/zelda.txt>.*

* cited by examiner

Primary Examiner—Teresa Walberg
Assistant Examiner—Robert Mendoza
(74) Attorney, Agent, or Firm—Greenblum & Bernstein, P.L.C.

(57) ABSTRACT

A setting map is displayed in which two kinds of map points relating to character capability setting, map points for restricting marker position movement, and map points that are irrelevant to the character capability setting are arranged. A marker movement destination is accepted in a movable range corresponding to first points that have been acquired during progress of a game and the first points are decreased in accordance with the accepted marker movement destination. The movement destination map point and map points adjacent to it are employed during processing subject map points. A category of each processing subject map point is recognized, and it is judged whether second points corresponding to the recognized category is greater than or equal to a prescribed value. A capability corresponding to a desired map point is set in accordance with a judgment result in response to a decision manipulation of the player and the second points are decreased by a prescribed value.

20 Claims, 6 Drawing Sheets

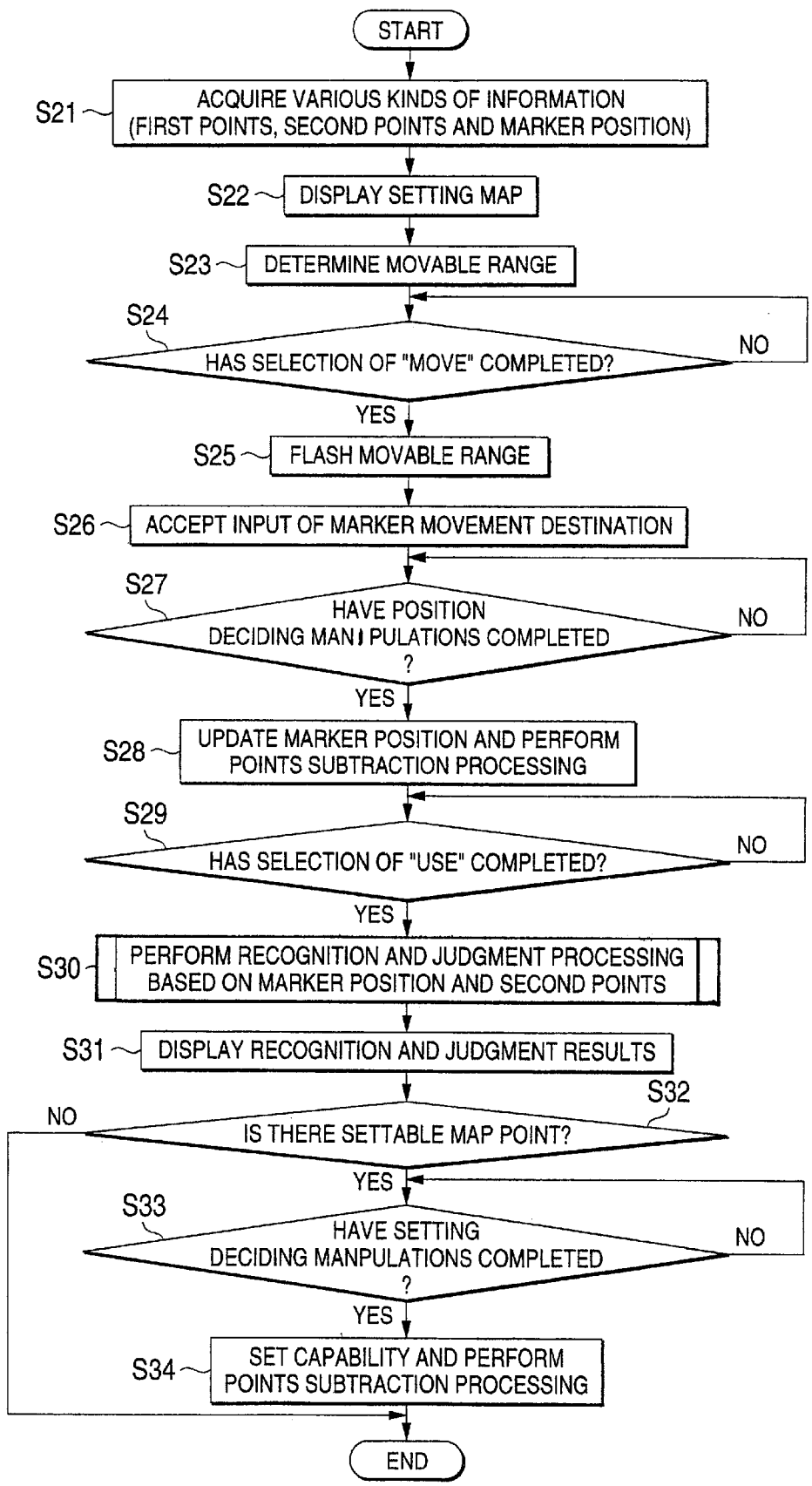

VIDEO GAME INCLUDING CHARACTER CAPABILITY SETTING

CROSS REFERENCE TO RELATED APPLICATION

The present disclosure relates to subject matter contained in Japanese Patent Application No. 2001-190363, filed on Jun. 22, 2001, the disclosure of which is expressly incorporated herein by reference in its entirety.

BACKGROUND OF THE INVENTION

1. Field of the Invention

The present invention relates to video games. More specifically, the present invention relates to a video game including a character capability setting.

2. Description of the Related Art

Role-playing games (hereinafter abbreviated as "RPGs") are known as one genre of video games using a computer. In RPGs, in general, characters play their roles in a game and a story develops as the player experiences a virtual adventure through a character (hereinafter referred to as "player character") that is manipulated by the player. In many cases, a character (hereinafter referred to as "opponent character") to confront a player character is set in each setting zone that is set in a virtual space. The player character advances to each zone, where it fights against an opponent character that obstructs the player character from attaining a goal of a story. The story develops as the player character defeats opponent characters.

A player character is manipulated with buttons, a joystick, etc. on a key-pad. The player character moves or performs a prescribed operation in response to a manipulation on the key-pad. A number of events such as battle scenes are provided to constitute a story. As various kinds of manipulation are performed in each event, the game progresses and the player acquires various kinds of points.

Many video games are known in which a capability of a player character to be exercised in a battle scene can be set when necessary. For example, there is a video game in which a character capability is set by using a setting map called "skill tree." A skill tree is prepared for each of three systems of capability that can be set for a character. A capability that is determined in accordance with points that have been acquired with progress of a game and a manipulation of the player is set for the character.

However, in conventional video games, to set each capability of a character, the player needs to perform setting manipulations using a setting picture corresponding to the capability to be set. This results in problems that it is difficult to check the content of a capability being set and that a capability checking operation is cumbersome and dull. These problems are more remarkable in a case where capabilities of multiple characters are set. A video game is desired in which a capability of a character can be set and checked simply and easily and a setting content can be selected with a high degree of freedom providing the player with more enjoyment.

SUMMARY OF THE INVENTION

The present invention has been made in view of the above problems in the art, and an object of the invention is therefore to provide a computer-readable recording medium on which a program of a video game in which a capability of a character can be set and checked simply and easily and a setting content can be selected with a high degree of freedom and which can give the player more enjoyment is recorded, a program of such a video game, and a related video game processing method and apparatus.

To attain the above object by solving the above problems, a first aspect of the invention provides a computer-readable recording medium on which a program of a video game in which a character capability can be set is recorded. The program causes a computer to display in response to a manipulation of a player, a map in which map points for giving a basic capability to a character and map points for giving a special capability to a character are arranged on prescribed routes. The computer also determines a movable range of a marker based on first points that have been acquired during progress of the video game immediately before a transition to the displaying and determines a marker position on the map at the time of a preceding setting. The computer further accepts a marker movement instruction that is given by a manipulation of the player and commands a movement of the marker to a destination marker position in the movable range that has been determined. The computer also causes updating from the marker position at the time of the preceding setting to the destination marker position that has been accepted, and consumes at least part of the first points, and sets a character capability in accordance with the accepted destination marker position.

According to the first aspect of the invention, map points for giving a basic capability to a character and map points for giving a special capability to a character are arranged on a setting map, which makes it possible to set character capabilities in a more complex manner. Therefore, a recording medium capable of giving the player more enjoyment can be provided.

In the recording medium according to the first aspect of the invention, map points that are irrelevant to setting of a character capability may also be arranged on the prescribed routes of the map. This adds a game-like factor to the setting of a character capability. Therefore, a recording medium capable of giving the player even more enjoyment can be provided.

In the recording medium according to the first aspect of the invention, the map points that are irrelevant to setting of a character capability may include map points for restricting marker movement. In this case, the marker movement is restricted by such map points as well as the first points that have been acquired during progress of the game. This adds an enhanced game-like factor to the setting of a character capability.

The recording medium according to the first aspect of the invention may be such that the video game can set capabilities of a group of characters individually, and that the map is divided in accordance with the number of settable characters. Moreover, markers of different characters are automatically provided as start positions in prescribed divisional regions of the map, one in each divisional region, when the video game is played for the first time. Map points for giving a basic capability to a character and map points for giving a special capability to a character may be arranged in each of the prescribed divisional regions according to assumed differences among initial capabilities of the characters. These measures make it possible to provide a recording medium in which differences among the capabilities of a group of characters can be set intentionally by using the same setting map and player capabilities can be set flexibly through selection by the player.

In the recording medium according to the first aspect of the invention, the program may cause the computer to further announce, on the map, in response to a manipulation of the player, the determined movable range. This allows the player to easily check the movable range of a marker. Therefore, a recording medium in which a character capability can be set simply and easily can be provided.

In the recording medium according to the first aspect of the invention, the program may cause the computer to further recognize a capability that can be set for a character based on the destination marker position that has been accepted and second points that have been acquired during progress of the video game immediately before the transition to the displaying. The character capability setting may set a character capability based on a recognition result of the recognizing and a manipulation of the player and consume at least some of the second points when a character capability is set. This adds an enhanced game-like factor to the setting of a character capability. Therefore, a recording medium capable of giving the player even more enjoyment can be provided.

In the recording medium according to the first aspect of the invention, map points as recognition subjects of the recognizing may be a group of map points centered by the accepted destination marker position. This adds an enhanced game-like factor to the setting of a character capability and necessitates strategic consideration in selecting a marker position.

In the recording medium according to the first aspect of the invention, the second points may include multiple kinds of points corresponding to respective categories of map points arranged on the prescribed routes of the map. The recognizing may also include judging whether a capability can be set based on a kind of points corresponding to a category of a map point as a recognition subject. This also adds an enhanced game-like factor to the setting of a character capability.

In the recording medium according to the first aspect of the invention, the program may cause the computer to further display the recognition result of the recognition in a partial area of a picture in which the map is displayed. This allows the player to easily recognize a settable capability. Therefore, a recording medium in which a character capability can be set simply and easily can be provided.

A second aspect of the invention provides a program of a video game in which a character capability can be set. The program causes a computer to display, in response to a manipulation of a player, a map in which map points for giving a basic capability to a character and map points for giving a special capability to a character are arranged on prescribed routes. The computer also determines a movable range of a marker based on first points that have been acquired during progress of the video game immediately before a transition to the displaying and also determines a marker position on the map at the time of preceding a setting. The computer also accepts a marker movement instruction that is given by a manipulation of the player and commands a movement of the marker to a destination marker position in the determined movable range. The computer further causes updating from the marker position at the time of the preceding setting to the accepted destination marker position, and consumes at least part of the first points. The computer thus sets a character capability in accordance with the accepted destination marker position.

According to the second aspect of the invention, map points for giving a basic capability to a character and map points for giving a special capability to a character are arranged on a setting map, which makes it possible to set character capabilities in a more complex manner. Therefore, more enjoyment can be given to the player.

In the program according to the second aspect of the invention, map points that are irrelevant to setting of a character capability may also be arranged on the prescribed routes of the map. This adds a game-like factor to the setting of a character capability. Therefore, even more enjoyment can be given to the player.

In the program according to the second aspect of the invention, the map points that are irrelevant to setting of a character capability may include map points for restricting marker movement. In this case, the marker movement is restricted by such map points as well as the first points that have been acquired during progress of the game. This adds an enhanced game-like factor to the setting of a character capability.

The program according to the second aspect of the invention may be such that the video game can set capabilities of a group of characters individually. In this case, the map is divided in accordance with the number of settable characters and markers of different characters are automatically provided as start positions in prescribed divisional regions of the map, one in each divisional region, when the video game is played first time. Map points for giving a basic capability to a character and map points for giving a special capability to a character may be arranged in each of the prescribed divisional regions according to assumed differences among initial capabilities of the characters. These measures make it possible to intentionally set differences among the capabilities of a group of characters using the same setting map and to set character capabilities flexibly through selection by the player.

In the program according to the second aspect of the invention, the program may cause the computer to further execute announcing, on the map, in response to a manipulation of the player, the determined movable range. This allows the player to easily check the movable range of a marker and hence to set a character capability simply and easily.

In the program according to the second aspect of the invention, the program may cause the computer to further recognize a capability that can be set for a character based on the accepted destination marker position and second points that have been acquired during progress of the video game immediately before the transition to the displaying. The character capability setting may also set a character capability based on a recognition result and a manipulation of the player and consume at least some of the second points if a character capability is set. This also adds an enhanced game-like factor to the setting of a character capability.

In the program according to the second aspect of the invention, map points as recognition subjects of the recognizing step may be a group of map points centered by the accepted destination marker position. This adds an enhanced game-like factor to the setting of a character capability and necessitates strategic consideration in selecting a marker position.

In the program according to the second aspect of the invention, the second points may include multiple kinds of points corresponding to respective categories of map points arranged on the prescribed routes of the map. The recognizing may also include judging whether a capability can be set based on a kind of points corresponding to a category of a map point as a recognition subject. This also adds an enhanced game-like factor to the setting of a character capability.

In the program according to the second aspect of the invention, the program may cause the computer to further display the recognition result in a partial area of a picture in which the map is displayed. This allows the player to easily recognize a settable capability and hence to set a character capability simply and easily.

A third aspect of the invention provides a video game processing method of a video game in which a character capability can be set. The method includes displaying, in response to a manipulation of a player, a map in which map points for giving a basic capability to a character and map points for giving a special capability to a character are arranged on prescribed routes. The method also includes determining a movable range of a marker based on first points that have been acquired during progress of the video game immediately before a transition to the displaying step and determining a marker position on the map at the time of preceding setting. The method further includes accepting a marker movement instruction that is given by a manipulation of the player and commands a movement of the marker to a destination marker position in the determined movable range. The method also includes causing updating from the marker position at the time of the preceding setting to the accepted destination marker position, and consuming at least some of the first points. The method also includes and setting a character capability in accordance with the accepted destination marker position.

According to the third aspect of the invention, map points for giving a basic capability to a character and map points for giving a special capability to a character are arranged on a setting map, which makes it possible to set character capabilities in a more complex manner. Therefore, more enjoyment can be given to the player.

A fourth aspect of the invention provides a video game processing apparatus including a storage that stores a program of a video game in which a character capability can be set; a computer for executing the program that is read from the storage; and a display device for picture display that is provided as output of the computer. The computer, by executing the program, displays, in response to a manipulation of a player, a map in which map points for giving a basic capability to a character and map points for giving a special capability to a character are arranged on prescribed routes. The computer also determines a movable range of a marker based on first points that have been acquired during progress of the video game immediately before the display of the map and determines a marker position on the map at the time of a preceding setting. The computer also accepts a marker movement instruction that is given by a manipulation of the player and commands a movement of the marker to a destination marker position in the determined movable range. The computer further causes updating from the marker position at the time of the preceding setting to the accepted destination marker position, and consumes at least some of the first points; and sets a character capability in accordance with the accepted destination marker position.

According to the fourth aspect of the invention, map points for giving a basic capability to a character and map points for giving a special capability to a character are arranged on a setting map, which makes it possible to set character capabilities in a more complex manner. Therefore, more enjoyment can be given to the player.

BRIEF DESCRIPTION OF THE DRAWINGS

FIG. 3 is a flowchart showing exemplary capability setting processing, according to the embodiment;

DESCRIPTION OF THE PREFERRED EMBODIMENTS

Figure 1:
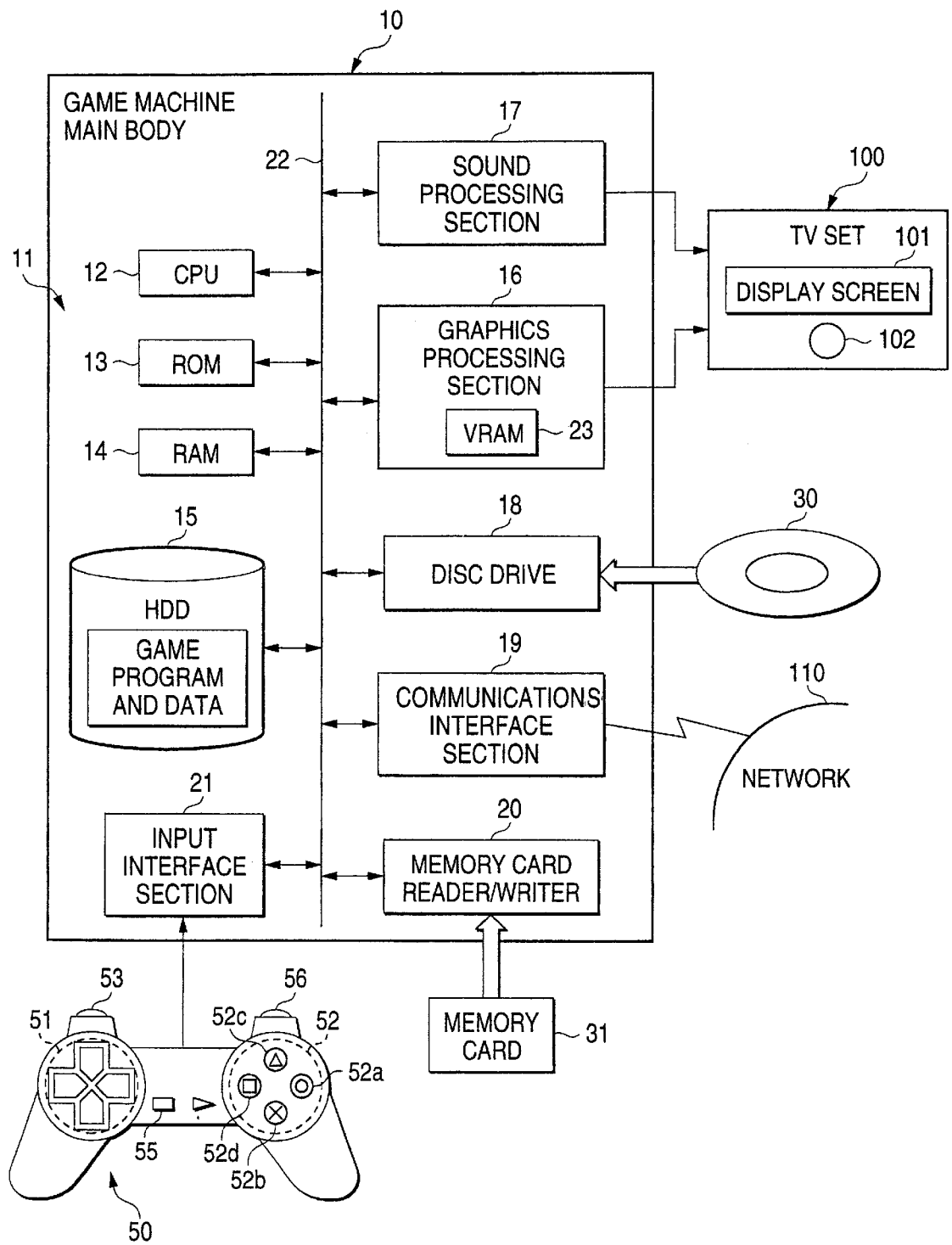
FIG. 1 is a block diagram showing an overall configuration of a video game machine, according to an embodiment of the present invention.

An embodiment of the present invention will be hereinafter described with reference to the accompanying drawings. FIG. 1 is a block diagram showing an overall configuration of a video game machine, according to an embodiment of the invention.

First, the configuration of the video game machine according to the embodiment of the invention will be described. For example, the video game machine 10 is composed of a game machine main body 11 and a key-pad 50 that is connected to the input side of the game machine main body 11. A TV set 100 having a CRT (cathode-ray tube), speakers, etc. is connected to the output side of the game machine main body 11.

For example, the game machine main body 11 has a CPU (central processing unit) 12, a ROM (read-only memory) 13, a RAM (random access memory) 14, a hard disk drive 15, a graphics processing section 16, a sound processing section 17, a disc drive 18, a communications interface section 19, a memory card reader/writer 20, and an input interface section 21, as well as a bus 22 that connects the above sections to each other. The game machine main body 11 is connected to the key pad 50 as a manipulation input section via the input interface section 21.

A cruciform key 51, buttons 52, etc. are provided on top portions of the key-pad 50. The buttons 52 include a "O" button 52a, a "×" button 52b, a "Δ" button 52c, and a "" button 52d. A selection button 55 is provided in the connection portion of a base portion where the cruciform key 51 is provided and a base portion where the buttons 52 are provided. Buttons such as an RI button 56 and an L1 button 53 are provided in side portions of the key-pad 50.

The key-pad 50 has switches that are in link with the cruciform key 51, "O" button 52a, "×" button 52b, "Δ" button 52c, " " button 52d, selection button 55, etc., respectively. When pressing force is applied to one button, the corresponding switch is turned on. A detection signal corresponding to turning-on or off of a switch is generated in the key-pad 50.

A detection signal generated in the key-pad 50 is supplied to the input interface section 21, which produces detection information indicating what button on the key-pad 50 was depressed. In this manner, an instruction that is given by the user by manipulating the key-pad 50 is supplied to the game machine main body 11.

The CPU 12 controls the entire apparatus intensively by executing an operating system that is stored in the ROM 13, and runs a video game program that is stored in a program area of the RAM 14. Monitoring the manipulation state of the key-pad 50 via the input interface 21, the CPU 12 runs, as necessary, the video game program stored in the program area of the RAM 14 and stores, when necessary, various data that occur as the game progresses in a prescribed area of the RAM 14. The ROM 13 has an EEPROM (electrically erasable and programmable read-only memory), which stores, before power-off, prescribed data in the RAM 14 that should be saved at the time of the power-off.

The RAM 14 mainly has a program area, an image data area, an audio data area, and an area where to store other data. Program data, image data, audio data, and other data that are read from a disc 30 such as a DVD or a CD-ROM by the disc drive 18 are stored in the respective areas.

The RAM 14 is also used as a work area. Various data that occur as a game progresses are also stored in the area in which to store other data. Program data, image data, audio data, and other data that are read from the disc 30 can be stored in the hard disk drive 15, and program data, image data, audio data, and other data that are once stored in the hard disk drive 15 may be transferred to the RAM 14 when necessary. Further, various data that occurred with progress of a game and are once stored in the RAM 14 may be transferred to and stored in the hard disk drive 15.

The graphics processing section 16 has, in a VRAM 23, a frame buffer as a buffer memory for storing image data. The graphics processing section 16 generates a video signal based on image data that is stored in the frame buffer according to control information that is supplied from the CPU 12 during execution of a program, and outputs the generated video signal to the TV set 100. As a result, a picture is displayed on the display screen 101 of the TV set 100 based on the image data stored in the frame buffer.

The sound processing section 17 has a function of generating an audio signal of background music, a conversation between characters, a sound effect, or the like. The sound processing section 17 outputs a sound signal including an audio signal to the TV set 100 based on data stored in the RAM 14 according to control information that is supplied from the CPU 12 during execution of a program.

Having the display screen 101 and the speakers 102, the TV set 100 outputs video (an image) and a sound corresponding to a current situation of a video game based on a video signal and a sound signal supplied from the game machine main body 11.

Configured in such a manner that the disc (e.g., a DVD or a CD-ROM) 30 as a recording medium can be set therein in a detachable manner, the disc drive 18 reads out program data, image data, audio data, and other data of a video game that are stored in the disc 30.

Connected to a network 110, the communications interface section 19 acquires various data by performing data communications with a data storage apparatus or an information processing apparatus such as a server that is provided at another location. Program data, image data, audio data, and other data of a video game to be stored in the RAM 14 may be acquired via the network 110 and the communications interface section 19.

Configured in such a manner that a memory card 31 can be set therein in a detachable manner, the memory card reader/writer 20 writes relatively small saving data such as interim data or environment setting data of a video game or like data to the memory card 31.

A program of a video game in which a capability of a character can be set when necessary is stored in the disc 30 which is a recording medium according to the embodiment of the invention, and the program can be read by the computer (i.e., the CPU 12 and its peripheral devices). The computer can display, in response to a manipulation of a player, a map in which map points for giving a basic capability to a character and map points for giving a special capability to a character are arranged on prescribed routes. The computer can also determine a movable range of a marker based on first points that have been acquired during progress of the video game immediately before a transition to the displaying and a marker position on the map at the time of preceding setting. The computer further accepts a marker movement instruction that is given by a manipulation of the player and commands a movement of the marker to a destination marker position in the movable range that has been determined. The computer can also cause updating from the marker position at the time of the preceding setting to the destination marker position that has been accepted, and consume at least some of the first points. Thus, the computer sets a character capability in accordance with the destination marker position that has been accepted.

The computer can further announce, on the map, in response to a manipulation of the player, the movable range that has been determined. The computer can further recognize a capability that can be set for a character based on the destination marker position that has been accepted and second points that have been acquired during progress of the video game immediately before the transition to the displaying. In the character capability setting, the computer can set a character capability based on a recognition result and a manipulation of the player and consume at least some of the second points if a character capability is set. The computer can further display the recognition result in a partial area of a picture in which the map is displayed.

Therefore, the game machine main body 11 has, in addition to the CPU 12 and functions that are necessary to run a conventional video game by software processing based on data stored in memories of respective sections, characteristic functions. The characteristic functions include a function of displaying, in response to a manipulation of a player, a map in which prescribed map points are arranged; and a function of determining a movable range of a marker based on first points and a marker position on the map at the time of preceding setting. The characteristic functions also include a function of accepting a marker movement instruction that is given by a manipulation of the player and commands a movement to a destination marker position in the determined movable range. The characteristic functions also include a function of causing updating from the marker position at the time of the preceding setting to the accepted destination marker position, and consuming at least some of the first points; and a function of setting a character capability in accordance with the accepted destination marker position.

The game machine main body 11 further has a function of announcing, on the map, in response to a manipulation of the player, the determined movable range. The game machine main body 11 also has a function of recognizing a capability that can be set for a character. In the character capability setting function, a character capability is set based on a recognition result obtained by the recognizing function and a manipulation of the player and at least some of the second points are consumed if a character capability is set. The game machine main body 11 further has a function of displaying the recognition result obtained by the recognizing function in a partial area of a picture in which the map is displayed.

Therefore, a video game can be realized in which a capability of a character can be set and checked simply and easily and a setting content can be selected with a high degree of freedom and which can give the player more enjoyment. It is noted that the above functions may be realized by dedicated hardware rather than software processing.

Figure 2:
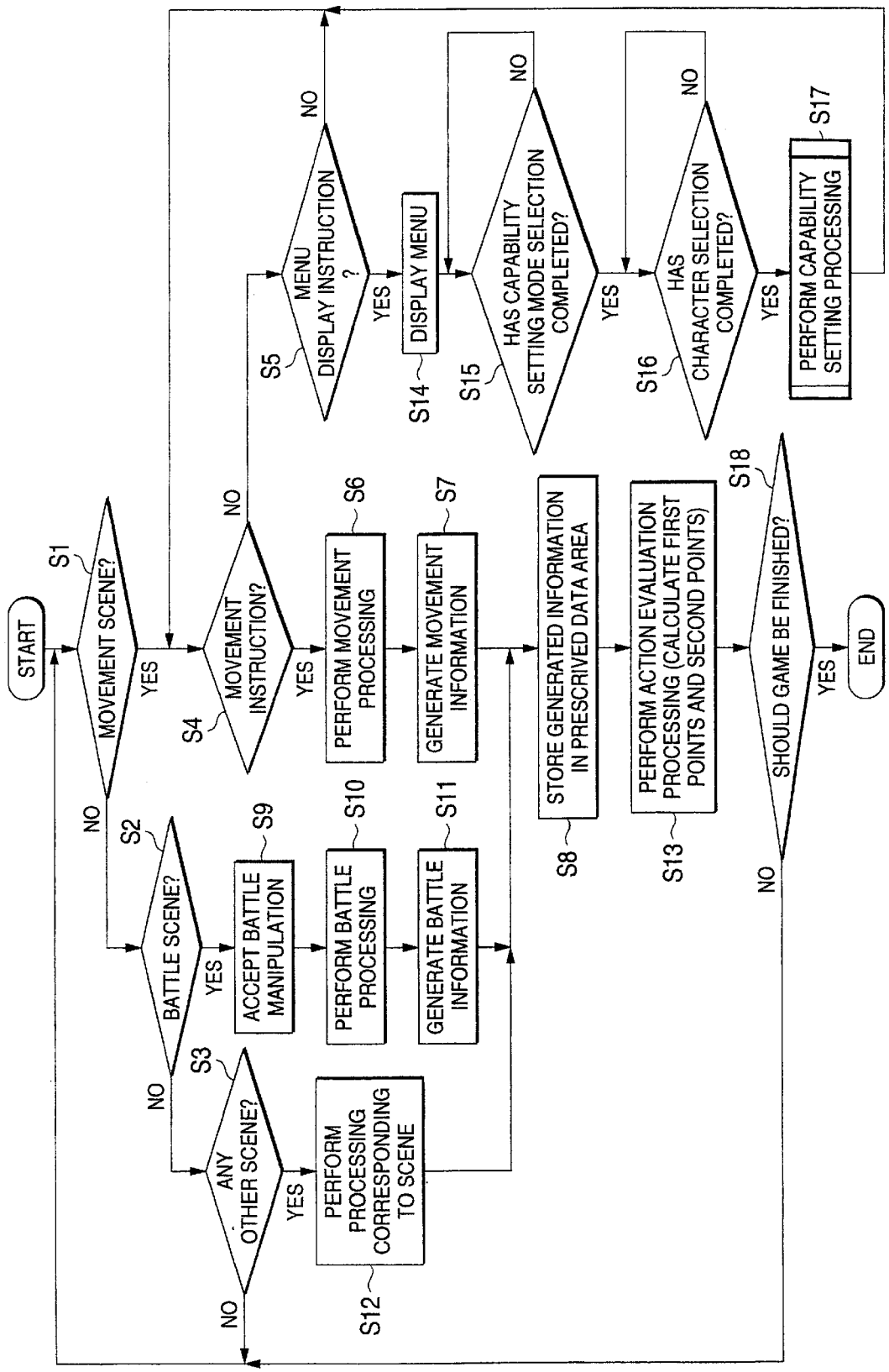
FIG. 2 is a flowchart showing an exemplary overall process of the video game machine of FIG. 1.

Next, the operation of the video game machine 10 according to the embodiment having the above configuration will be described. FIG. 2 is a general flowchart showing an exemplary overall process of the video game machine 10. The operation will be described with an assumption that a video game is configured in such a manner that a capability can be set for each of the player characters that can join a battle that involves multiple player characters.

First, when the power is turned on (not shown in FIG. 2), a boot program is read out, the individual sections are initialized, and processing for starting a game is performed. Specifically, program data, image data, audio data, and other data of a video game that are stored in the disc (a DVD or a CD-ROM) 30 are read by the disc drive 18 and stored in the RAM 14. If necessary, data stored in a writable nonvolatile memory such as the EEPROM of the ROM 13, the hard disk drive 15, the memory card 31, or the like are read out and stored in the RAM 14. A state that the actual game can progress is established only after various settings have been made prior to its start. When the game starts in this state, a scene that is a movement scene, a battle scene, or some other scene and the process goes to step S1.

At step S1, it is judged whether the current scene is a movement scene. If it is judged that the current scene is not a movement scene, the process goes to step S2, where it is judged whether the current scene is a battle scene. If it is judged at step S2 that the current scene is not a battle scene, the process goes to step S3, where it is judged whether the current scene is some other scene (e.g., a conversation scene, a shopping scene, or a pickup scene). If it is judge at step S3 that the current scene is not another scene, the process returns to step S1 and a standby state is established in which steps S1–S3 are executed repeatedly.

If it is judged at step S1 that the current scene is a movement scene, the process goes to step S4, where it is judged whether a movement instruction has been given. If it is judged that no movement instruction has been given, the process goes to step S5, where it is judged whether a menu display instruction has been given. If it is judged that no menu display instruction has been given, the process returns to step S4, where a standby state is established in which steps S4 and S5 are executed repeatedly. If it is judged at step S4 in this state that a movement instruction has been given, the process goes to step S6, where movement processing for a player character is performed according to the movement instruction. At step S7, movement information indicating a current position of the player character and a setting zone including the current position in a virtual space is generated. Upon the generation of the movement information, the process goes to step S8.

If it is judged at step S2 in the standby state in which steps S1–S3 are repeatedly executed that the current scene is a battle scene, the process goes to step S9 and a state for accepting a battle manipulation is established. Battle processing corresponding to an accepted battle manipulation is performed at step S10, and battle information indicating battling player character and opponent character name, development and a result of the battle, states of parameters that prescribe post-battle capabilities of the player character, and other information is generated at step S11. Upon the generation of the battle information, the process goes to step S8.

If it is judged at step S3 in the standby state in which steps S1–S3 are repeatedly executed that the current scene is some other scene (e.g., a conversation scene, a shopping scene, or a pickup scene), the process goes to step S12, where processing corresponding to the scene is performed and other information corresponding to the processing is generated. The process then goes to step S8.

If the process goes to step S8 via steps S6 and S7, the movement information is stored in a prescribed data area of the RAM 14, whereby the current position of the player character is updated. If the process goes to step S8 via steps S10 and S11, the battle information of the setting scene is stored in a prescribed data area of the RAM 14. If the process goes to step S8 via step S12, the other information is stored in a prescribed data area of the RAM 14. Action histories of the player character are stored for the respective setting zones.

At step S13, action evaluation processing is performed based on the information indicating the action histories of the player character that is temporarily stored in the RAM 14. Specifically, information that needs to be converted into numerical values is done so by using a conversion table that is prepared in advance, and information that needs to be weighted is multiplied by a prescribed coefficient. Resulting numerical values are added up into first points and second points. The first points and second points thus calculated are added to old first points and old second points stored in a prescribed data area of the RAM 14 and addition results are stored in the same data area. In this manner, the first points and the second points as evaluation information are updated whenever necessary.

As described later, the first points are used for determining a marker movable range on a setting map in setting a capability of a character. The second points include three kinds of points a, b, and c that correspond to the kinds of map points that are arranged on the setting map. The second points a, b, and c are used for discriminating settable capabilities from each other and canceling a marker movable range.

After completion of the above action evaluation processing, the process goes to step S18, where it is judged whether the game should be finished. If it is judged that the game should not be finished, the process returns to step S1 and a standby state is established in which steps S1–S3 are executed repeatedly.

On the other hand, if the current scene was judged a movement scene at step S1 and it is judged at step S5 in the standby state in which steps S4 and S5 are executed repeatedly that a menu display instruction has been given, the process goes to step S14, where a menu is displayed. At step S15, it is judged whether capability setting mode selection manipulations have completed. The process goes to step S16 only if the judgment result of step S15 is affirmative. At step S16, it is judged whether character selection manipulations have completed. The process goes to step S17 only if the judgment result of step S16 is affirmative.

At step S17, capability setting processing using a setting map is performed. Specifically, prescribed map points that are generally classified into four categories are arranged on the setting map. Capability setting information of a player character as a setting subject is generated based on a marker position on the setting map, first points and second points a, b, and c that have been acquired during progress of the game, and selection manipulations by the player. The capability setting information is stored in a prescribed data area of the RAM 14, whereby the character setting is completed. Upon the completion of the character capability setting processing, the process returns to step S4 and a standby state is established in which steps S4 and S5 are executed repeatedly. The process can go to the capability setting processing whenever necessary. As for the character capability setting, a desired capability can be given to a selected character while restrictions are imposed by the map points on the setting map as long as the first points and the second points a, b, and c satisfy prescribed conditions.

If it is judged at step S18 that the game should be finished, although not shown in FIG. 2, the information indicating the action histories of the character that is stored in the prescribed data area of the RAM 14, the first points and the second points a, b, and c as the evaluation information, and the capability setting information of the player character are read from the RAM 14 and transferred to and stored in a writable nonvolatile memory such as the EEPROM of the ROM 13, the hard disk drive 15, the memory card 31, or the like with other data. After other various kinds of processing associated with finishing of the game have been performed, the power is turned off and the game is finished. The various kinds of information and other data that were stored in the nonvolatile memory by the data saving processing that was performed before the turning-off of the power are read from the nonvolatile memory as the saving destination when the power is turned on again and are again stored in the same data areas of the RAM 14 as they were stored before the turning-off of the power.

Figure 4A:
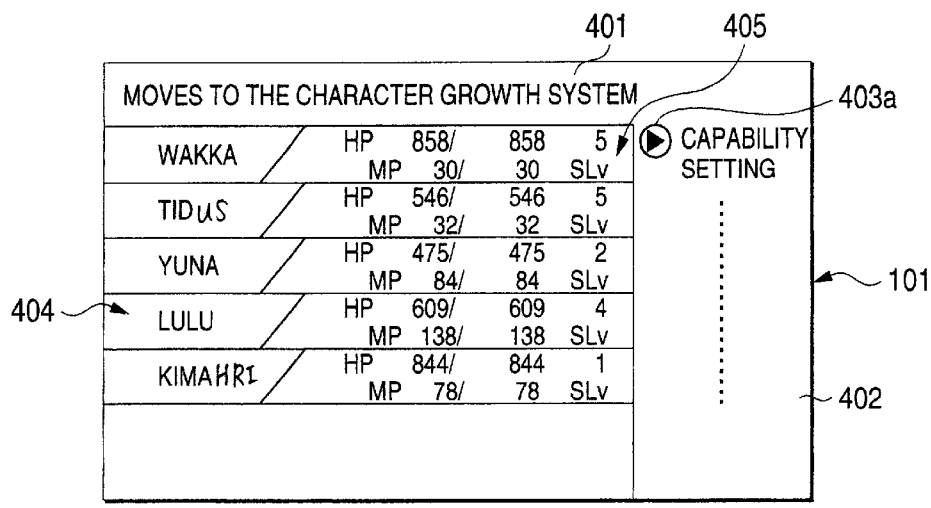
FIGS. 4A–4C show exemplary display pictures according to the embodiment.
Figure 4B:
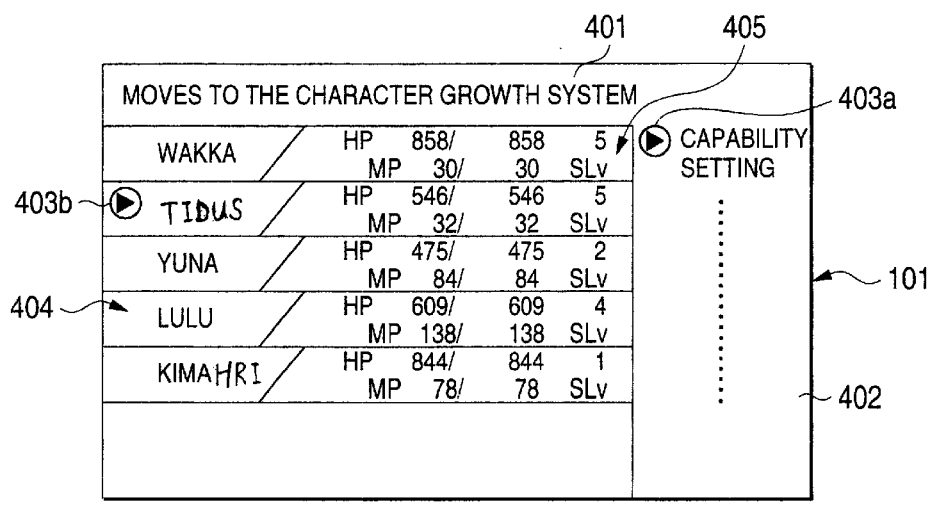
Figure 4C:
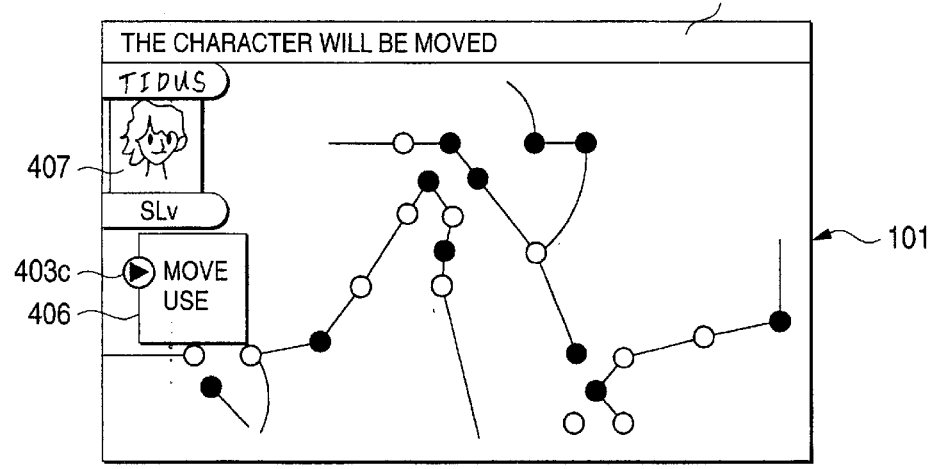

FIG. 3 is a general flowchart showing an exemplary process of the above-described capability setting processing (step S17) according to the embodiment. FIGS. 4A–4C are specific examples of display pictures that appear until a transition to the capability setting processing (step S17) is made. The operation of the video game machine 10 will be described in more detail with reference to FIGS. 3 and 4A–4C.

First, if a menu display instruction is given by depressing the "Δ" button 52c in a moving scene, a menu picture is displayed as shown in FIG. 4A. The menu picture includes menu selection items in a right-end area 402 of the displayed picture. If the "O" button 52a is depressed in this state in a state that "capability selection" has been selected by moving a cursor 403a with the cruciform key 51, capability setting mode selection manipulations are completed.

In the state that "capability setting" is selected, a comment "Moves to the character growth system" that announces the selected item is shown in a top area 401 of the displayed picture as shown in FIG. 4A. Each character name and numerical values indicating states of parameters that prescribe capabilities of the character are shown in this order from the left end in an area 404 that includes the center of the displayed picture and has a width that is about ⅓ of the width of the displayed picture. First points are shown on the right of these numerical value as denoted by reference numeral 405.

After completion of capability setting mode selection manipulations, manipulations of selecting a character as a capability setting subject are performed as shown in FIG. 4B. Character selection manipulations are completed when the "O" button 52a is depressed in a state that a desired character has been selected by moving a cursor 403b with the cruciform key 51. FIG. 4B shows a state that "Tidus" is selected as a capability setting subject.

When prescribed manipulations have been performed in the above-described manner, the process goes to the capability setting processing. First, at step S21, first points and second points a, b, and c that have been acquired during progress of the game immediately before the transition to the capability setting processing and information indicating a marker position of the character as the current setting subject at the time of the preceding setting are acquired. The process then goes to step S22, where a picture of FIG. 4C is newly displayed that includes a setting map. In this state, a window is opened in a left-center area 406 of the displayed picture including the setting map. Commands "move" and "use" are shown in the window. The face of the character as the capability setting subject, its name, etc. are displayed in an area 407 that is located above the window. In this state, the marker position at the time of the preceding setting is indicated as a bright spot in the setting map.

Figure 5:
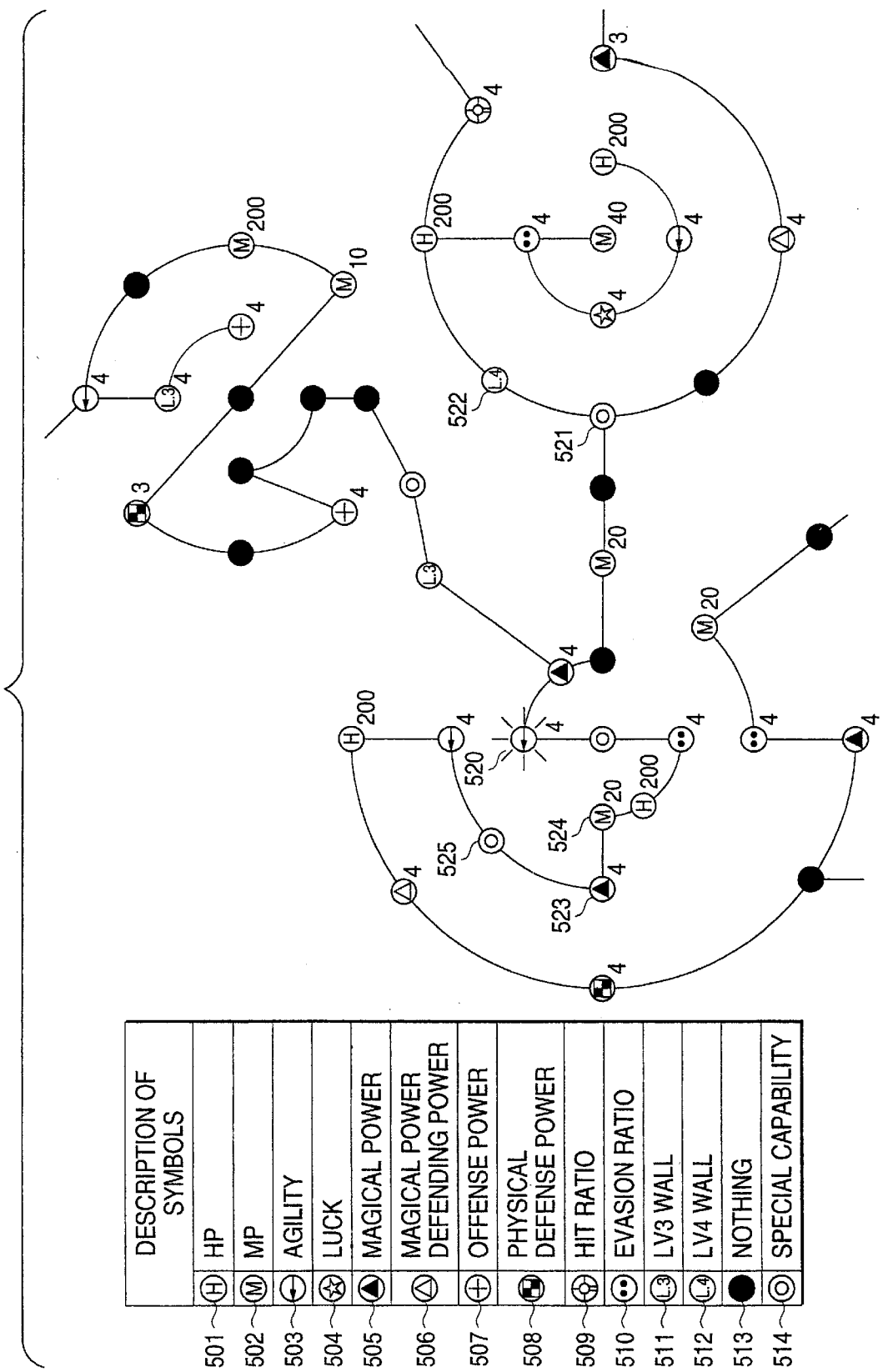
FIG. 5 is an enlarged chart of part of an exemplary setting map, according to the embodiment.

FIG. 5 is an enlarged chart of part of the setting map that is used for character capability setting. The setting map will be described with reference to FIG. 5. Map points that are generally classified into two kinds of map points relating to the character capability setting, map points that restrict movement of the marker position, and a map point that is irrelevant to the character capability setting are arranged in the setting map as shown in FIG. 5. Each map point is connected to at least one other map point via a prescribed route. In FIG. 5, reference numeral 520 denotes a marker position at the time of the preceding setting. It is assumed that the marker position 520 is indicated as a bright spot.

One kind of map points relating to the character capability setting are map points for giving common capabilities and are denoted by reference numerals 501–510 in FIG. 5 (in order from the top, HP: hit point, MP: magic point, agility, luck, magical power, magical power defending power, offense power, physical defense power, hit ratio, and evasion ratio). Fighting capabilities in a battle scene are defined by these common capabilities. The other kind of map point relating to the character capability setting is a map point for giving a special capability and is denoted by reference numeral 514 in FIG. 5. For example, the special capability is a capability that is put into effect only when a prescribed manipulation has been made in a battle scene. The kinds of map points that restrict movement of the marker position are denoted by reference numerals 511 and 512 in FIG. 5 (level-3 wall and level-4 wall). The kind of map point that is irrelevant to the character capability setting is denoted by reference numeral 513 in FIG. 5.

When the setting map has been displayed in the above-described manner, at step S23, processing of determining a marker position movable range is performed based on the first points. Specifically, with assumptions that the first points are "5" and that the marker position at the time of the preceding setting is the position denoted by reference numeral 520 in FIG. 5, the marker position is made movable in a range of 10 map points from a map point 521 to a map point 523. At step S24, it is judged whether manipulations for selecting the command "move" have completed. The process goes to step S25 only if it is judged that manipulations for selecting the command "move" have completed. A judgment "manipulations for selecting the command "move" have completed" is made and the process goes to step S25 when the "O" button 52a is depressed in a state that "move" has been selected by moving a cursor 403c with the cruciform key 51 as shown in FIG. 4C.

At step S25, the marker position movable range is flashed on the setting map. In the state that the movable range is being flashed, a comment "The character will be moved" that announces the selected item is shown in the top area 401 of the displayed picture as shown in FIG. 4C. A step S26, a marker movement destination accepting state is established. At step S27, it is judged whether manipulations for deciding a marker movement destination position have completed.

The process goes to step S28 only if it is judged that such deciding manipulations have completed. A judgment that manipulations for deciding a marker movement destination position have completed is made when the "O" button 52a is depressed in a state that a desired position in the movable range has been selected by moving the marker with the cruciform key 51, and the process goes to step S28.

At step S28, the information indicating the marker position at the time of the preceding setting is updated to the one that has been specified this time and is stored in a prescribed data area of the RAM 14. Further, a map point movement number is subtracted from the first points and a subtraction result is stored in a prescribed data area of the RAM 14. That is, when the marker position is updated, part of the acquired first points that are equal to the map point movement number are consumed. If the first points are equal to zero, no marker movement instruction is accepted. When the marker again passes a map point that it passed previously, part of the first points that are consumed are made smaller than in a case where the marker passes no such map point.

At step S29, it is judged whether manipulations for selecting the command "use" have completed. The process goes to step S30 only if it is judged that such selection manipulations have completed. A judgment that manipulations for deciding a marker movement destination position have completed is made when the "O" button 52a is depressed in a state that the command "use" has been selected by moving the cursor key 403c with the cruciform key 51, and the process goes to step S30. At step S30, recognition and judgment processing is performed based on the updated marker position and the second points.

Figure 6:
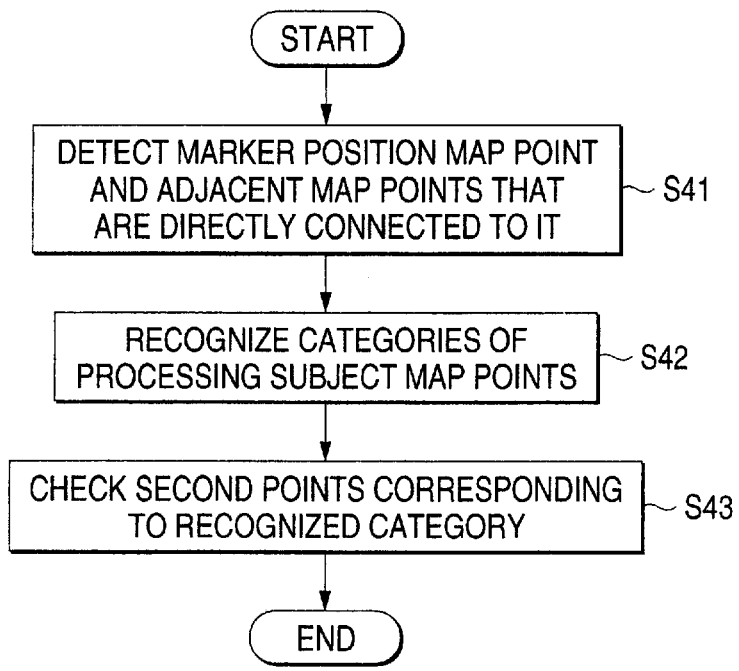
FIG. 6 is a flowchart showing exemplary recognition and judgment processing, according to the embodiment.

FIG. 6 is a general flowchart showing an exemplary process of the recognition and judgment processing based on the updated marker position and the second points. The recognition processing will be described below with reference to FIG. 6.

When a transition has been made to the recognition and judgment processing based on the marker position and the second points, first, at step S41, a map point that coincides with the marker position and adjacent map points that are directly connected to the former map point are detected. At step S42, the marker position map point and the adjacent map points are made processing subject map points and their categories are recognized.

If a map point 523, for example, in FIG. 5 is a marker movement destination, map points 523, 524, and 525 are made processing subject map points and categories of the three map points are recognized. If a map point 521 in FIG. 5 is a marker movement destination, map points 521 and 522 are made processing subject map points and categories of the two map points are recognized. In the latter case, the other two map points that are irrelevant to the character capability setting and the marker movement restriction are excluded from the processing subject map points.

At step S43, the second points corresponding to the recognized category are checked. Specifically, if the map point concerned is one for giving a common capability to a character, it is judged whether the value of the second points a is greater than or equal to a prescribed value. It is judged that the common capability of the map point concerned is settable only if the value of the second points a is greater than or equal to the prescribed value. Similarly, if the map point concerned is one for giving a special capability to a character, it is judged whether the value of the second points b is greater than or equal to a prescribed value. It is judged that the special capability of the map point concerned is settable only if the value of the second points b is greater than or equal to the prescribed value. If the map point concerned is one for restricting marker movement, it is judged whether the value of the second points c is greater than or equal to a prescribed value. It is judged that the marker's being prohibited from moving ahead of the map point concerned can be canceled only if the value of the second points c is greater than or equal to the prescribed value.

Upon completion of the recognition and judgment processing based on the marker position and the second points, the process goes to step S31, where recognition and judgment results obtained at step S30 are displayed in a window that is opened in a prescribed area of the picture in which the setting map is displayed. Upon completion of the display of the recognition and judgment results, the process goes to step S32, where it is judged based on the recognition and judgment results whether there exists a settable map point or a map point where the marker movement restriction can be canceled. If it is judged that such a map point exists, the process goes to step S33. If it is judged at step S32 that there does not exist a settable map point or a map point where the marker movement restriction can be canceled, the execution of the series of capability setting steps is finished.

At step S33, it is judged whether setting deciding manipulations have completed. The process goes to step S34 only if it is judged that setting deciding manipulations have completed. A judgment that setting deciding manipulations have completed is made when the "O" button 52a is depressed in a state that one of the desired recognition or judgment results has been selected by moving a cursor key in the recognition and judgment results display window with the cruciform key 51, and the process goes to step S34. In this state, a comment announcing the selected settable item is shown in the top area 401 of the displayed picture and the corresponding subject map point is indicated as a bright spot.

At step S34, the capability corresponding to the selected subject map point is set. Specifically, if the subject map point is a map point for giving a common capability to a character, the parameter that prescribes the capability of the character is read from a prescribed data area of the RAM 14 and a prescribed numerical value is added to the parameter and an addition result is stored in the prescribed data area of the RAM 14. Further, the second points a are read from a prescribed data area of the RAM 14 and a prescribed numerical value is subtracted from the second points a. A subtraction result is stored in the prescribed data area of the RAM 14.

If the selected subject map point is a map point for giving a special capability to a character, a flag for enabling the special capability is set to "1" and stored in a prescribed data area of the RAM 14. Further, the second points b are read from a prescribed data area of the RAM 14 and a prescribed numerical value is subtracted from the second points b. A subtraction result is stored in the prescribed data area of the RAM 14. If the selected subject map point is a map point for restricting marker movement, processing is so performed as to cancel the marker movement restriction. Further, the second points c are read from a prescribed data area of the RAM 14 and a prescribed numerical value is subtracted from the second points c. A subtraction result is stored in the prescribed data area of the RAM 14.

For example, assume that a map point 523 in FIG. 5 is a marker movement destination, second points corresponding to the categories of respective processing subject map points are greater than or equal to the prescribed values and hence satisfy the conditions, and a map point 525 is selected as a capability setting map point. In this case, a flag for enabling a special capability "protes" corresponding to the map point 525 is set and subtraction processing is performed on the second points b. A special capability is put into effect only when a prescribed manipulation is performed in a battle scene. Multiple kinds of special capabilities are prepared: one for lowering a fighting capability of an opponent character, one for enhancing a fighting capability of a character on the player's side, one for changing the numerical values of multiple parameters at the same time, one for changing the numerical values of a parameter of multiple characters at the same time, etc. The special capabilities are given respective names, one of which is "protes."

Assume that a map point 523 in FIG. 5 is a marker movement destination, second points corresponding to the categories of respective processing subject map points are greater than or equal to the prescribed values and hence satisfy the conditions, and a map point 524 is selected as a capability setting map point. In this case, a prescribed numerical value "20" is added to the MP (magic point) parameter corresponding to the map point 524 to enhance the fighting capability and subtraction processing is performed on the second points a. If the map point 523 is selected as a capability setting map point, a prescribed value "4" is added to the magical power parameter corresponding to the map point 523 to enhance the fighting capability and subtraction processing is performed on the second points a. A numerical value that is given to each map point in the setting map of FIG. 5, which is one of the items 501–510, is a value to be added to the corresponding parameter.

Assume that a map point 521 in FIG. 5 is a marker movement destination, second points corresponding to the categories of respective processing subject map points are greater than or equal to the prescribed values and hence satisfy the conditions, and the map point 521 is selected as a capability setting map point. In this case, a flag for enabling a special capability "cura" corresponding to the map point 521 is set and subtraction processing is performed on the second points b. If a map point 522 is selected as a setting map point, the marker movement restriction corresponding to the map point 522 is canceled and the marker is thereby allowed to move ahead of the map point 522. Further, subtraction processing is performed on the second points c.

When a capability is set or a marker movement restriction is canceled and subtraction processing is performed on the second points in association with the former processing, the processing subject map point is shown brightly in a color that is different for each player character and in a form that is different than other displays (not shown in FIG. 3) and the series of capability setting steps are finished.

Although not shown in FIG. 3, if the "Δ" button 52c is depressed during the capability setting processing, the numerical values of the parameters of the HP (hit point), MP (magic point), agility, luck, magical power, magical power defending power, offense power, physical defense power, hit ratio, and evasion ratio are displayed. If the "Δ" button 52c is depressed once more, the special capability setting states of the respective names are displayed. These displays are canceled if the "×" button 52c is depressed. Therefore, the player can check the capability setting states of a desired character whenever necessary.

Although not shown in FIG. 3, if the L1 button 53 or the R1 button 56 is depressed during the capability setting processing, the setting subject character is changed. That is, the characters are shifted in prescribed order every time the Li button 53 or the R1 button 56 is depressed; the setting subject character is changed in a circulated manner. Therefore, the player can set a capability of a desired character whenever necessary. Although not shown in FIG. 3, if the selection button 55 is depressed during the capability setting processing, the magnification factor of a display area of the setting map having the marker position as the center is changed. Therefore, part of the setting map can be displayed with a necessary magnification factor. This allows the player to check, whenever necessary, an arrangement of map points and their relationships with routes.

Figure 7:
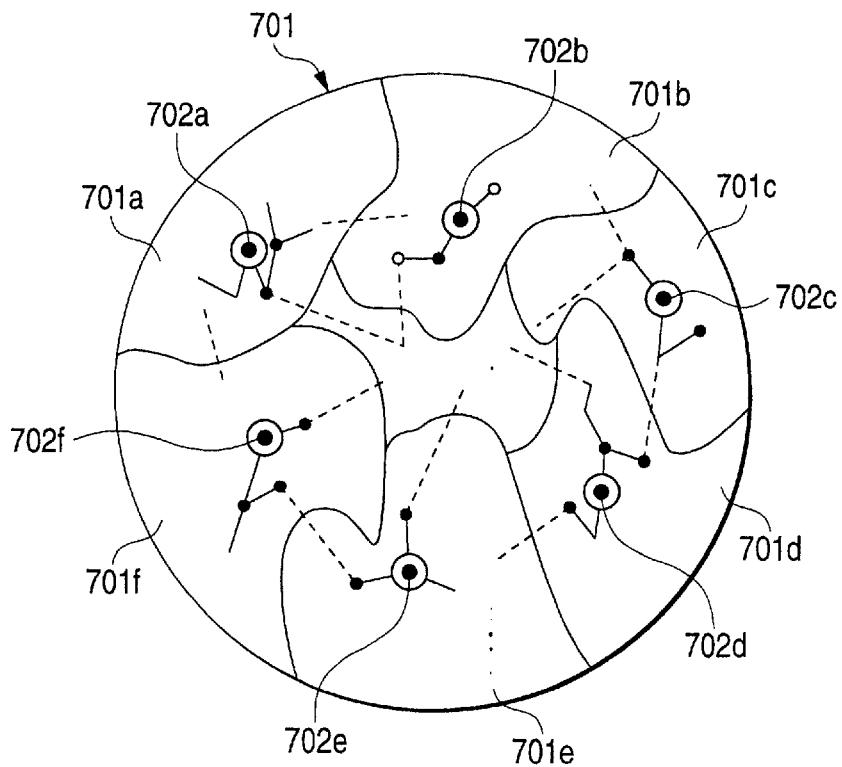
FIG. 7 is a schematic chart showing all of an exemplary setting map, according to the embodiment.

FIG. 7 is a schematic chart showing all of an exemplary setting map that is used for character capability setting. A relationship between individual regions of the setting map and characters and start positions of markers that are used for the above-described capability setting processing will be described below with reference to FIG. 7. Six characters A–F are prepared as player characters that can join a battle.

The setting map of FIG. 7 is divided into seven regions. Two kinds of map points to participate in setting of a capability of a character are arranged in each of divisional regions 701a–701f other than the central divisional region according to assumed differences among the initial capabilities of the characters. Each map point is connected to at least one other map point via a prescribed route (map points that are connected to each other may belong to different divisional regions). The start positions of markers corresponding to the respective characters are automatically set at respective points 702a–702f that are located approximately at the centers of the respective divisional regions 701a–701f when the game is played first time.

Specifically, the map points 702a–702f are made start positions of markers that are used for capability setting of the characters A–F, respectively.

That is, when the game is played the first time, positions around which prescribed map points are arranged are automatically employed as start positions. Therefore, in the early stages of the game, the characters are given characteristic capabilities that are assumed to some extent. In the middle and later stages of the game, first points and second points are acquired as the game progresses and hence a marker can be moved to a divisional region that is adjacent to the divisional region containing the start position. Capabilities that match the player's taste can be set for each character.

The above-described embodiment provides many advantages, such as the following advantages.

A first advantage is as follows. Since map points for giving a basic capability to a character and map points for giving a special capability to a character are arranged on a setting map, character capabilities can be set in a more complex manner and hence more enjoyment can be given to the player.

A second advantage is as follows. Since map points that are irrelevant to setting of a character capability are also arranged on prescribed routes of a setting map, a game-like factor is added to the setting of a character capability and hence even more enjoyment can be given to the player.

A third advantage is as follows. Since the map points that are irrelevant to setting of a character capability include map points for restricting marker movement, an enhanced game-like factor is added to the setting of a character capability and hence even more enjoyment can be given to the player.

A fourth advantage is as follows. A setting map is divided in accordance with the number of settable characters, prescribed map points are arranged in each of prescribed divisional regions, and markers of different characters are automatically provided as start positions in the prescribed divisional regions, one in each divisional region, when the game is played the first time. Therefore, differences among the capabilities of multiple characters can be set intentionally by using the same setting map and character capabilities can be set flexibly through selection by the player.

A fifth advantage is as follows. Since a marker movable range and a recognition and judgment result of a settable capability are displayed, the player can easily check the marker movable range and the settable ability and hence can set a character capability simply and easily.

A sixth advantage is as follows. A capability that can be set for a character is recognized and judged based on a marker position and second points, and a character capability is set based on a recognition and judgment result and a manipulation of the player. At least some of the second points are consumed if a character capability is set. Therefore, an enhanced game-like factor is added to the setting of a character capability and hence even more enjoyment can be given to the player.

Other embodiments will be described below. In the first embodiment described above, map points that are generally classified into two kinds of map points relating to the character capability setting, map points for restricting marker position movement, and map points that are irrelevant to the character capability setting are arranged on a setting map, and the recognition and judgment processing is performed on the two kinds of map points relating to the character capability setting and the map points for restricting marker position movement by using second points a, b, and c. However, map points may be categorized more finely and the recognition and judgment processing may be performed by using second points that are increased in the number of kinds accordingly. For example, whereas in the first embodiment map points where one of the parameters of the HP (hit point), MP (magic point), agility, luck, magical power, magical power defending power, offense power, physical defense power, hit ratio, and evasion ratio is set are classified into a single category, they may be classified into three categories. In this case, the recognition and judgment processing may be performed by using second points a, b, c, d, and f that conform in number to the categories of map points.

In the first embodiment, a marker movement destination is accepted in a movable range corresponding to first points and the movement destination map point and map points adjacent to it are employed as processing subject map points. A category of each processing subject map point is recognized, and it is judged whether second points corresponding to the recognized category is greater than or equal to a prescribed value. A character capability is set in accordance with a judgment result in response to a decision manipulation of the player. However, only a marker movement destination may be employed as a processing subject. A capability may be set in accordance with an accepted map point upon its acceptance.

The first embodiment is directed to the case where a capability can be set for each of the player characters that can join a battle that involves multiple player characters. The invention can easily be applied to a case involving a single character. A character having any of various characteristic capabilities can be set simply and easily by making it possible to select a start position on a setting map in accordance with a manipulation of the player on a single character.

It is apparent that the invention is not limited to any of the above embodiments and each embodiment can be modified properly without departing from the scope and spirit of the invention. It is noted that the same components in the drawings are given the same reference symbols.

As described above, the invention makes it possible to set and check a capability of a character simply and easily, select a setting content with a high degree of freedom, and increases the player's enjoyment.

What is claimed is:

1. A video game processing apparatus comprising:
    a storage that stores a program of a video game in which a character capability can be set;
    a computer for executing the program that is read from the storage; and
    a display device for picture display that is provided as output of the computer,
    wherein the computer, by executing the program,
        displays, in response to a first manipulation of a player, a map in which map points for giving a basic capability to a character and map points for giving a special capability to the character are arranged on prescribed routes;
        determines a movable range of a marker based on first points that have been acquired during progress of the video game immediately before the display of the map and a marker position on the map at the time of a preceding setting;
        accepts a marker movement instruction that is given by a second manipulation of the player and commands a movement of the marker to a destination marker position in the determined movable range;
        causes updating from the marker position at the time of the preceding setting to the accepted destination marker position, and consumes at least part of the first points; and
        sets the character capability in accordance with the accepted destination marker position; and
        recognizes the capability that can be set for the character based on the destination marker position that has been accepted and second points that have been acquired during progress of the video game immediately before the transition to the displaying, and
        wherein the character capability setting sets the character capability based on a recognition result of the recognizing and a third manipulation of the player and consumes at least part of the second points when the character capability is set.

2. A video game processing method of a video game in which a character capability can be set, comprising:
    displaying, in response to a first manipulation of a player, a map in which map points for giving a basic capability to a character and map points for giving a special capability to the character are arranged on prescribed routes;
    determining a movable range of a marker based on first points that have been acquired during progress of the video game immediately before a transition to the displaying and a marker position on the map at the time of a preceding setting;
    accepting a marker movement instruction that is given by a second manipulation of the player and commands a movement of the marker to a destination marker position in the movable range that has been determined;
    causing updating from the marker position at the time of the preceding setting to the destination marker position that has been accepted, and consuming at least part of the first points;

setting the character capability in accordance with the destination marker position that has been accepted; and recognizing the capability that can be set for the character based on the destination marker position that has been accepted and second points that have been acquired during progress of the video game immediately before the transition to the displaying, and wherein the character capability setting sets the character capability based on a recognition result of the recognizing and a third manipulation of the player and consumes at least part of the second points when the character capability is set.

3. A computer-readable recording medium on which a program of a video game in which a character capability can be set is recorded, the program causing a computer to execute:

displaying, in response to a first manipulation of a player, a map in which map points for giving a basic capability to the character and map points for giving a special capability to a character are arranged on prescribed routes;

determining a movable range of a marker based on first points that have been acquired during progress of the video game immediately before a transition to the displaying and a marker position on the map at the time of a preceding setting;

accepting a marker movement instruction that is given by a second manipulation of the player and commands a movement of the marker to a destination marker position in the movable range that has been determined;

causing updating from the marker position at the time of the preceding setting to the destination marker position that has been accepted, and consuming at least part of the first points;

setting the character capability in accordance with the destination marker position that has been accepted; and recognizing the capability that can be set for the character based on the destination marker position that has been accepted and second points that have been acquired during progress of the video game immediately before the transition to the displaying, and wherein the character capability setting sets the character capability based on a recognition result of the recognizing and a third manipulation of the player and consumes at least part of the second points when the character capability is set.

4. The computer-readable recording medium according to claim 3, wherein map points that are irrelevant to setting of the character capability are also arranged on the prescribed routes of the map.

5. The computer-readable recording medium according to claim 4, wherein the map points that are irrelevant to setting of the character capability include map points for restricting marker movement.

6. The computer-readable recording medium according to claim 3, wherein the video game can set capabilities of a plurality of characters individually, and wherein the map is divided in accordance with a number of settable characters and markers of different characters are automatically provided as start positions in prescribed divisional regions of the map, one in each divisional region, when the video game is played a first time.

7. The computer-readable recording medium according to claim 6, wherein map points for giving the basic capability to the character and map points for giving the special capability to the character are arranged in each of the prescribed divisional regions according to assumed differences among initial capabilities of the characters.

8. The computer-readable recording medium according to claim 3, wherein the program causes the computer to further execute announcing, on the map, in response to a fourth manipulation of the player, the movable range that has been determined.

9. The computer-readable recording medium according to claim 3, wherein map points as recognition subjects of the recognizing comprise a plurality of map points centered by the destination marker position that has been accepted.

10. The computer-readable recording medium according to claim 3, wherein the second points include a plurality of types of points corresponding to respective categories of map points arranged on the prescribed routes of the map, and wherein the recognizing further comprises judging whether the capability can be set based on a type of points corresponding to a category of a map point as a recognition subject.

11. The computer-readable recording medium according to claim 3, wherein the program causes the computer to further execute displaying the recognition result in a partial area of a picture in which the map is displayed.

12. A program of a video game in which a character capability can be set, the program causing a computer to execute:

displaying, in response to a first manipulation of a player, a map in which map points for giving a basic capability to a character and map points for giving a special capability to the character are arranged on prescribed routes;

determining a movable range of a marker based on first points that have been acquired during progress of the video game immediately before a transition to the displaying and a marker position on the map at the time of a preceding setting;

accepting a marker movement instruction that is given by a second manipulation of the player and commands a movement of the marker to a destination marker position in the movable range that has been determined;

causing updating from the marker position at the time of the preceding setting to the destination marker position that has been accepted, and consuming at least part of the first points;

setting the character capability in accordance with the destination marker position that has been accepted; and recognizing the capability that can be set for the character based on the destination marker position that has been accepted and second points that have been acquired during progress of the video game immediately before the transition to the displaying, and wherein the character capability setting sets the character capability based on a recognition result of the recognizing and a third manipulation of the player and consumes at least part of the second points when the character capability is set.

13. The program according to claim 12, wherein map points that are irrelevant to setting of the character capability are also arranged on the prescribed routes of the map.

14. The program according to claim 13, wherein the map points that are irrelevant to setting of the character capability include map points for restricting marker movement.

15. The program according to claim 12, wherein the video game can set capabilities of a plurality of characters individually, and wherein the map is divided in accordance with a number of settable characters and markers of different characters are automatically provided as start positions in prescribed divisional regions of the map, one in each divisional region, when the video game is played a first time.

16. The program according to claim 15, wherein map points for giving the basic capability to the character and map points for giving the special capability to the character are arranged in each of the prescribed divisional regions according to assumed differences among initial capabilities of the characters.

17. The program according to claim 12, wherein the program causes the computer to further execute announcing, on the map, in response to a fourth manipulation of the player, the movable range that has been determined.

18. The program according to claim 12, wherein map points as recognition subjects of the recognizing comprises a plurality of map points centered by the destination marker position that has been accepted.

19. The program according to claim 12, wherein the second points include a plurality of types of points corresponding to respective categories of map points arranged on the prescribed routes of the map, and wherein the recognizing further comprises judging whether the capability can be set based on a type of points corresponding to a category of a map point as a recognition subject.

20. The program according to claim 12, wherein the program causes the computer to further execute displaying the recognition result in a partial area of a picture in which the map is displayed.

* * * * *